United States Patent [19]
Roy et al.

[11] Patent Number: 6,077,423
[45] Date of Patent: Jun. 20, 2000

[54] COMBINATION ABOVE GRADE AUTOMATIC STORMWATER SEPARATION FILTRATION SYSTEM AND METHOD OF SEPARATION AND FILTRATION

[75] Inventors: John R. Roy; David L. Earl; William L. Hamrick; Philip G. King, all of San Antonio, Tex.

[73] Assignee: SWAF, Inc., San Antonio, Tex.

[21] Appl. No.: 09/157,866

[22] Filed: Sep. 21, 1998

Related U.S. Application Data

[60] Provisional application No. 60/059,492, Sep. 22, 1997.

[51] Int. Cl.[7] .............................. B01D 21/24; B01D 35/00
[52] U.S. Cl. .......................... 210/121; 210/138; 210/170; 210/323.2
[58] Field of Search ..................................... 210/747, 170, 210/138, 121, 143, 323.1, 323.2, 242.1, 295, 96.1, 136, 117, 236, 122

[56] References Cited

U.S. PATENT DOCUMENTS

| | | | |
|---|---|---|---|
| 1,457,637 | 6/1923 | Sievers | 210/122 |
| 3,722,686 | 3/1973 | Arnett et al. | 210/242.1 |
| 4,268,005 | 5/1981 | Raftis et al. | 251/5 |
| 4,504,397 | 3/1985 | Matthews | 210/138 |
| 5,433,845 | 7/1995 | Greene et al. | 210/170 |
| 5,536,420 | 7/1996 | Oyzboyd | 210/804 |
| 5,897,773 | 4/1999 | Rhodes | 210/242.1 |

*Primary Examiner*—David A. Simmons
*Assistant Examiner*—Frank M. Lawrence
*Attorney, Agent, or Firm*—Jackson Walker L.L.P.

[57] ABSTRACT

A method and system for treating stormwater runoff containing impurities includes collecting the runoff in a basin and allowing the runoff to settle in the basin for a predetermined time before allowing the filtration step to be initiated. The time delay is controlled by a controller sensitive to rain fall, turbidity, or other variables selected by the user. During the filtration step a separator member is positioned floatingly between a filter element and impurities floating on the surface of the unfiltered water.

6 Claims, 11 Drawing Sheets

COMBINATION ABOVE GRADE AUTOMATIC STORMWATER SEPARATION FILTRATION SYSTEM AND METHOD OF SEPARATION AND FILTRATION

This application claims priority from prior U.S. provisional application Ser. No. 60/059,492, filed Sep. 22, 1997.

BACKGROUND OF THE INVENTION

The present invention relates to stormwater sedimentation, separation, filtration and treatment systems and a method of stormwater sedimentation, separation, filtration and treatment. More specifically the present invention relates to an above grade canister type filtration system utilizing replaceable filter cartridges within the canisters combined with an electronic control system and automatic valve, a floating separation device, and a method of filtering stormwater runoff from developed areas.

In recent years, many local state and federal regulations have required installation of stormwater abatement systems to achieve filtration of stormwater runoff prior to exiting development projects. Many developments are required to construct and maintain stormwater sedimentation and filtration basins with each basin having a particular configuration to match the particular development project. However, existing basins have been constructed with the primary purpose of capturing and filtering prior to the release of a certain quantity of stormwater runoff from the development project. The majority of the current stormwater filtration sedimentation basins utilize a sand filter bed usually eighteen inches or more in depth overlying along or beneath the grade perforated polyvinyl chloride (PVC) pipe or the like. This current method is designed to cause the stormwater captured in the basin to be drained by gravity through the sand bed causing filtration of the water prior to entering the PVC drain pipes beneath the sand filtration media.

The current technology utilized in existing sedimentation and filtration basins has a variety of problems. The primary problems associated with the current technology are that small particulate matter in the stormwater settles to the bottom of the filtration basin causing a blinding and clogging of the filter media (i.e., sand), unacceptable drawdown, point discharging, water stagnation, and increased bypass potential. To overcome these problems the party responsible for maintaining the stormwater filtration system must incur enormous costs in regrading, raking, and often times replacing the filter media (i.e., sand, or diatomaceous earth, etc.) after each rainfall event.

A further problem is the large amount of land required for construction of a sedimentation basin and a separate filtration basin used in combination for stormwater control. By combining the sedimentation and filtration processes within the same basin, the amount of land needed for the entire stormwater filtration system (basins, etc.) is dramatically reduced affording the developer additional developmental land or reducing the overall land required to be purchased for a development project.

Yet a further problem is the disposal of large quantities of filter material (i.e., sand, diatomaceous earth, etc.) during maintenance. When the filter media becomes contaminated, polluted or otherwise inefficient or ineffective, the filter media has to be physically removed and transported off-site for disposal. In almost every case the quantity of filter material currently being removed and transported for disposal drastically increases the cost of maintenance. Additionally, with current technology a responsible party cannot perform maintenance on or dispose or replace filtration media at times when the media has become clogged or blinded and the basin above the media is full of stormwater runoff. The present invention provides for a contained cartridge type filtration system which can be installed above grade in a horizontal or vertical position which will allow gravity filtration of stormwater at appropriate times through canister filtration systems utilizing filter media which can be easily removed and disposed in on-site disposal containers or through other appropriate means. It provides a filtration system which allows for filter media replacement with water standing in the filtration and sedimentation basins without causing the risk of release of contaminated stormwater.

Although there have been devices that either filter stormwater or devices that cause the shut off of stormwater flow upon the sensing of pollution, the present invention utilizes a distinct and unique technology involving a process and mechanism of combined sedimentation, separation and filtration. Automated sensing and logic components provide filtration at an optimum level; together with a mechanism to prevent water flow until maximum filtration and maximum sedimentation have been achieved. This multi-function device and process is distinguishable from the prior art with respect to both the filtration of stormwater as well as the shut off of stormwater flow upon sensing pollutants. While existing devices provide for a removable filtration medium, they all have a common element of being at or below grade. The present invention provides an above grade filtration canister system, not activated until maximum sedimentaiton and separation has occurred, and filtration of the "first flush" of runoff water having the heaviest concentration of pollutant loadings. The runoff which occurs after the "first flush" has been captured is diverted into the stormwater sewer system. The entire "first flush" runoff contemplated in this process is contained in a basin to allow maximum filtration, separation and sedimentation prior to it being treated through the filters with subsequent release through automatic shut off valve into a collecting stormwater sewer system or receiving stream.

SUMMARY OF THE INVENTION

An above basin grade stormwater separation and filtration system comprising a plurality of filtration canisters containing replaceable filter media or cartridges plumbed to a common drain pipe is controlled by an automated shut-off valve activatable by an electronic controller. This allows filtration and separation of stormwater to begin after sedimentation has occurred over a specified period of time and/or when the turbidity of stormwater being held for filtration has been reduced to a specified level. The electronic controller is capable of monitoring environmental conditions and the conditions of the stormwater being held for filtration. The controller opens and closes the automated shut-off valve as necessary to allow separation and filtration at optimum times. The above grade separation and filtration canisters do not blind or clog as a result of sedimentation because they are installed above grade in a variety of configurations. The basin of the present invention may be poured in place on the development site or be a precast rectangular concrete unit with required plumbing and valving systems for use where a precast unit is more economical or desirable.

The sediment build ups in the combined sedimentation filtration basin of the present invention are removed following a periodic maintenance schedule without any detrimental effect to the filtration capabilities. Separation of hydrocarbons and other floating pollutants accumulated at the surface level of the contained water is achieved by use of a circular floating separation member on the filtration canister. This separation efficiency is enhanced by allowing the separator member to float along the filtration canister length as the basin water level drops during filtration or rises due to additional rain fall. The above grade filtration system may be constructed as part of a new development or retrofitted to existing sedimentation and filtration basins.

The present invention provides: (a) an efficient method of stormwater, sedimentation, separation and filtration without the need for separate sedimentation and filtration separation basins and the maintenance and labor costs associated with maintaining and removing of a large area of filter media; (b) a filtration method that employs self-contained filtration cartridges that can be removed and cleaned or disposed of in a cost effective and efficient manner; (c) a method of stormwater filtration and separation which meets local, state and federal requirements in a manner that requires the acquisition and utilization of the least amount of property in association with development projects, reducing the overall costs of the development; and (d) an access area for maintenance allowing use of the surface area over the basin for parking or other development.

Additional advantages and uses will be apparent from the description provided herein for those familiar with the relevant art. The foregoing advantages are achieved in an above grade stormwater separation and filtration system utilizing a single basin for separation, sedimentation and filtration employing one or more filtration canisters and separator devices tied to a common drain pipe controlled by an automated shut-off valve activated by an electronic controller box in accordance with the present invention.

BRIEF DESCRIPTION OF THE DRAWINGS

The accompanying drawings which are incorporated in and form a part of the specification, illustrate the embodiments of the present invention and together with the description serve to explain the principles of the invention. In the drawings.

DETAILED DESCRIPTION OF THE PREFERRED EMBODIMENT

Figure 1:
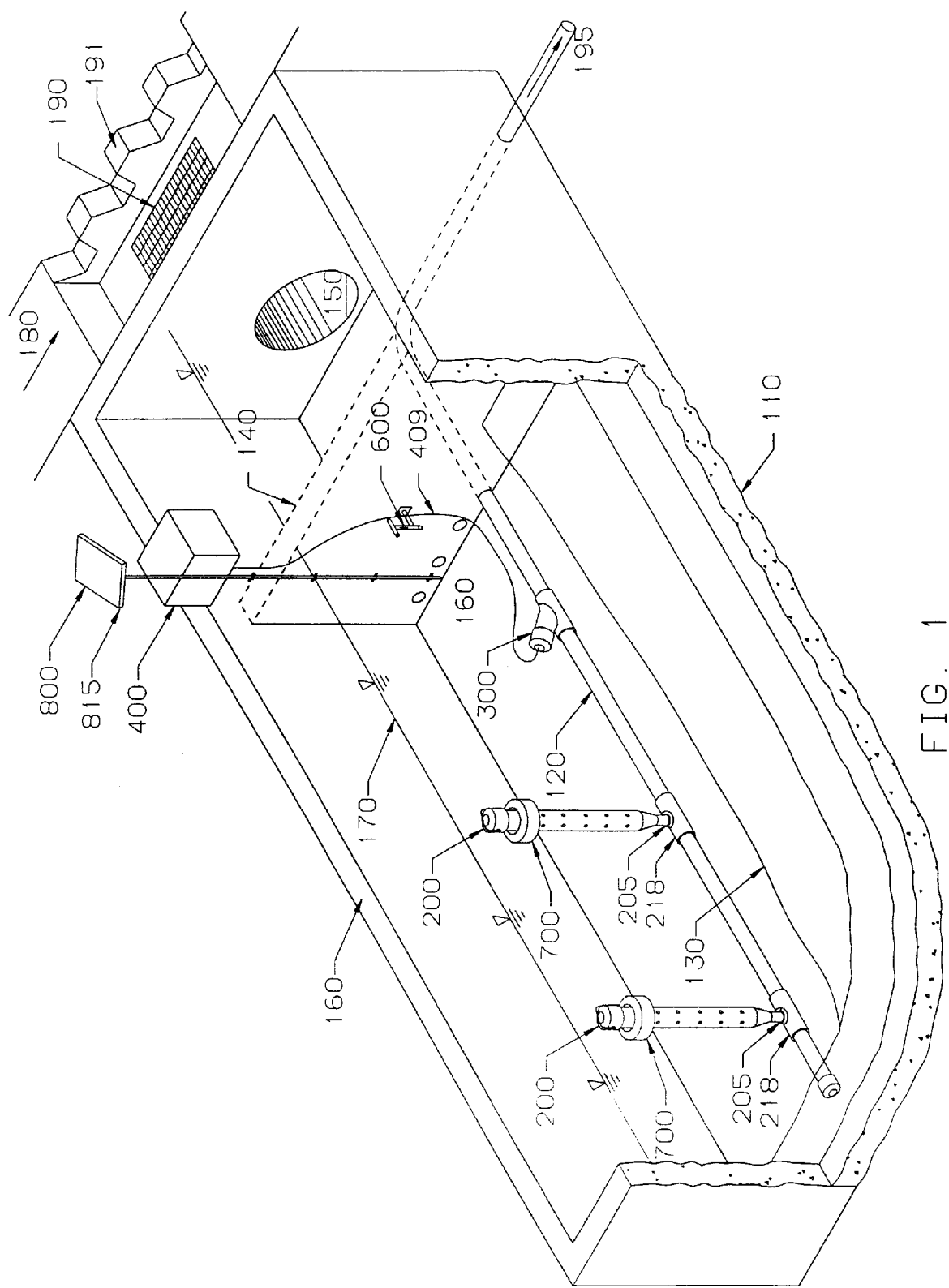
FIG. 1 is a partial, cut-away perspective and isometric view of the above basin grade filtration chamber showing a series of filter canisters plumbed to a common drain pipe controlled by an automated shut-off valve that is activated by an electronic controller using input from a number of sensors, including but not limited to, a turbidity meter, timers, and precipitation sensors, in accordance with this disclosure.

In situations where there is a need, due to stormwater regulations or otherwise, to treat stormwater running off paved or impervious surfaces, the present invention as illustrated in FIG. 1 provides an apparatus and method of treatment that includes separation, sedimentation and filtration of polluted storm water. The invention can be applied to existing sedimentation and filtration basins by retrofitting the existing filtering system which may be less efficient and more expensive to maintain. Additionally, the present invention can be applied to new construction allowing developments to reduce the area required for the treatment basin in addition to obtaining more efficient treatment and decreased maintenance costs. Further, the invention can be applied to new construction through use of a module precast and preplumbed concrete chamber containing the preferred embodiment of the filtration system.

In the preferred embodiment of the invention as shown in FIG. 1, a concrete basin 160 is used to capture the first flush of runoff (i.e., ½", ¾" etc.) from the impervious area in a real estate development that contains the majority of all pollutants that have accumulated on the impervious surface since the last rainfall event. In the preferred embodiment of the invention as applied to existing basins, the separation portion of the basin 150 is no longer required, as separation takes place in the filtration basin 160 by means of the floating separator device 700. Tis allows an increase in total capture volume for first flush filtration due to the fact that the separation chamber becomes a holding chamber 150 for ultimate separation, sedimentation and filtration.

When a rainfall event begins, the rain sensor 815 is activated which causes the digital controller to activate the shut off valve 300 to prevent stormwater from being discharged into the stormwater drainage until time has passed to allow for sedimentation to occur. As stormwater fills the basin the floating separator devices 700 rise around the filter canisters 200 to prevent pollutants on the water surface (oils, hydrocarbons, floating matter, etc.) from coming in contact with the filter canisters 200. If the water level in the basin rises above the top of the filter canister 200 the separation device 700 is held in place by bouancy at the top of the filter canister 200 by striking the rim of the cap 202 that is attached to the top of the canister unit 200. Once the basin has reached capacity, additional cleaner runoff is routed to the storm sewer bypassing the basin by use of a weir 191 or other suitable means.

Figure 8:
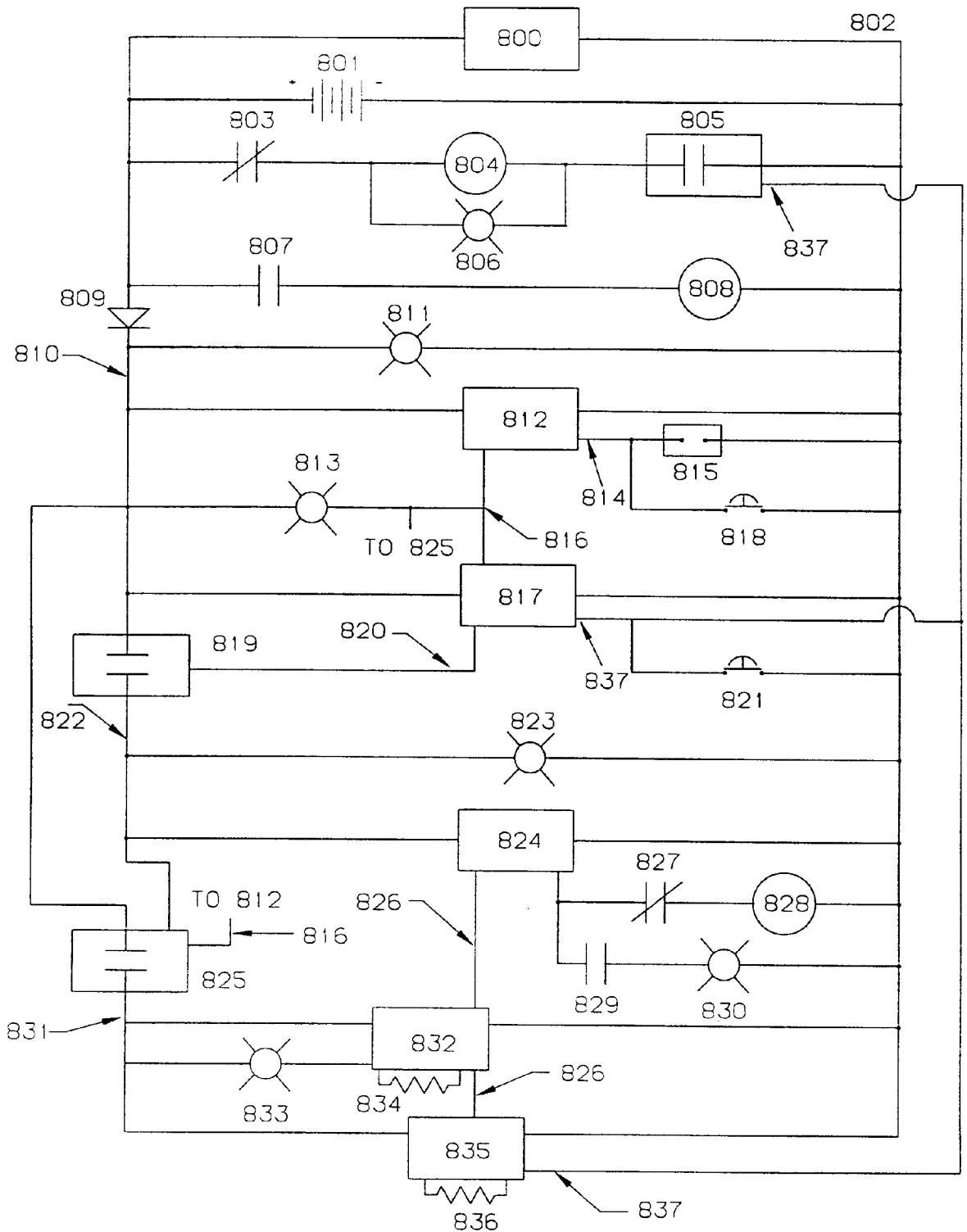
FIG. 8 is a circuit diagram of the logic board that monitors environmental conditions and activates and stops filtration accordingly.

After the rain sensor 815 activates the digital controller FIG. 8 and closes the shut off valve 300, a digital timer is tripped after the rainfall event stops to allow a preset amount of time to pass thereby allowing sedimentation to occur before the filtering process begins. After the preset time has passed, the digital controller 413 opens the control valve 300 (if the optional turbidity sensor 600 is used, the control unit 400 verifies the clarity of the water before opening the control valve 300).

After the control valve 300 is opened, the stormwater is allowed to begin filtering through the filter canisters 200. As the water level 170 in the basin drops, the separator devices 700 descend down the outside of the filter canisters 200 maintaining a physical barrier between the floating pollutants on water surface and the filter canister 200. The stormwater entering the filter canister 200 passes through the filter cartridge 505 (FIG. 5) and into the drain pipe 120 which conveys the filtered stormwater through the open valve 300 to the storm sewer or receiving stream 195.

In the event the rain sensor 815 detects rainfall during the filtration cycle, or the turbidity sensor 600 detects turbidity in excess of a preset level, the digital controller 413 activates the compressor 408 (FIG. 4) and closes the flow valve 300. The filtration cycle is allowed to resume after additional time has passed to allow reduction of the turbidity.

Figure 2:
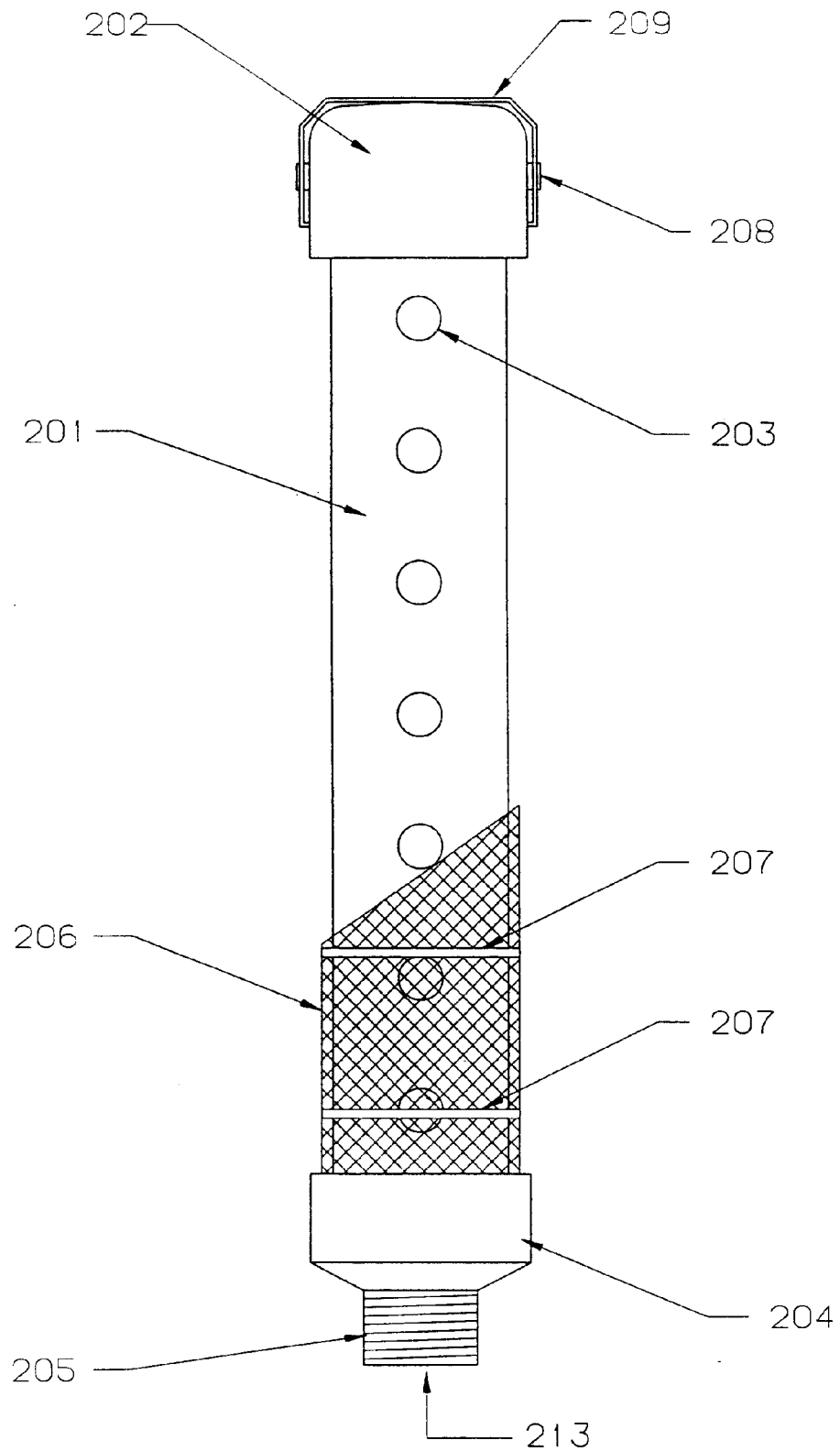
FIG. 2 is a perspective view of the filtration canister that is utilized in the overall filtration system in accordance with this disclosure.
Figure 5:
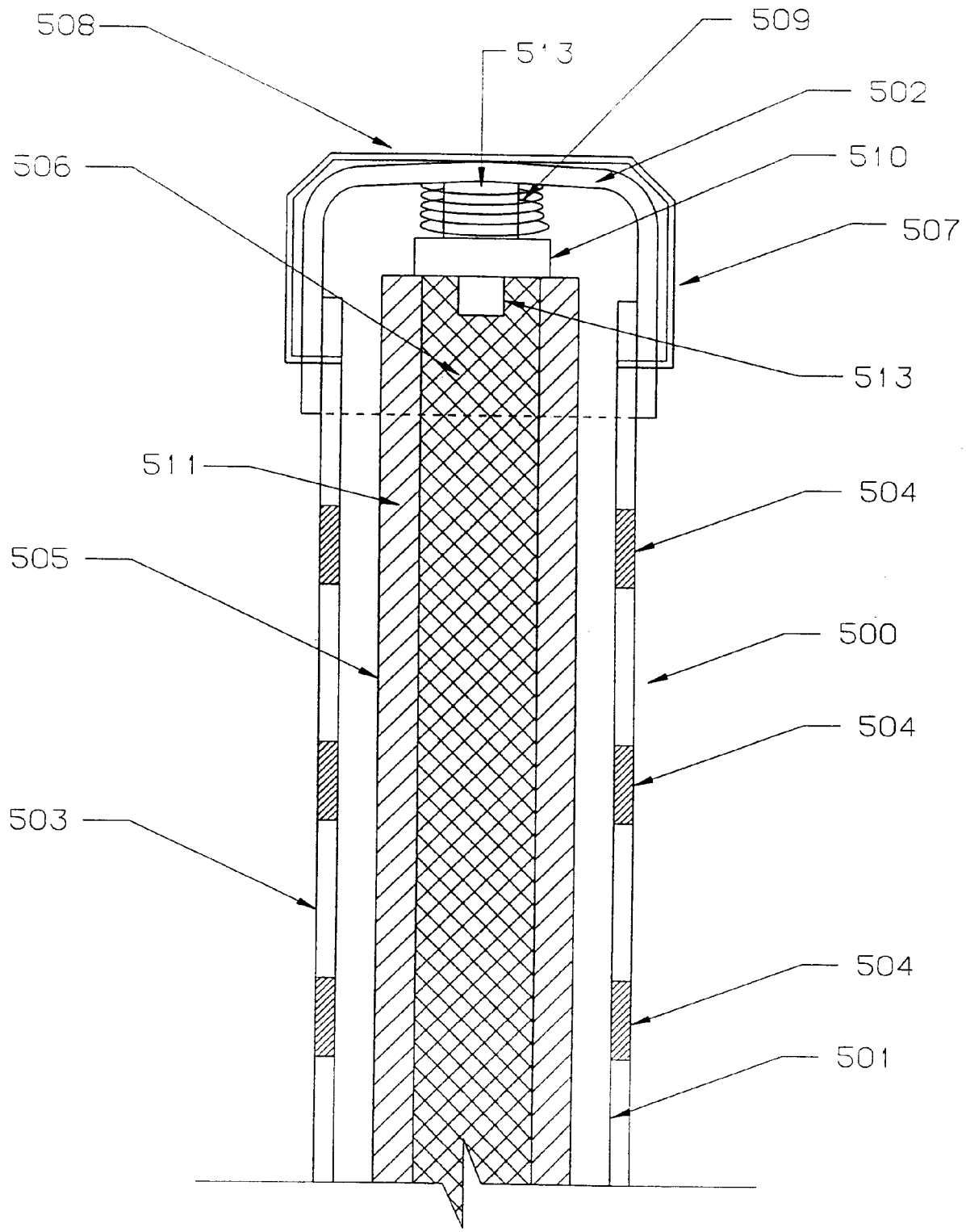
FIG. 5 is a cross section of the internal arrangement of the filtration canister depicting the filter cartridge and spring loaded locking and sealing mechanisms in the canister cap.

In the preferred embodiment of the filter canister 200 as depicted in FIG. 2, the canister 200 is a cylinder 201 made of PVC or other suitable material that is sized larger than the diameter of the filter cartridge 505 to be used. Atop the cylinder 201 is a cap 202 that is designed to fit snugly around the outside surface of cylinder 201 eliminating bypass potential. In the preferred embodiment, a multiplicity of large inlet ports or holes 203 provide an opening for water to pass from outside cylinder 201 to the area between the filter cartridge 505 and the wall of the cylinder 503 as depicted in FIG. 5. The cylinder 201 as depicted in FIG. 2 is seated in the base 204. Base 204 is used to reduce the diameter of the cylinder 201 portion of the filter canister. Base 204 is equipped with a fastening mechanism 205, which in the preferred embodiment is a threaded pipe section. The cylinder 201 portion of the filter canister as depicted in FIG. 2 is covered in an external filter media such as a metal or fabric mesh or screen 206 that may be spaced away from the outer wall of cylinder 201 by means of a spacer ring 207 made of rubber or other suitable alternative material.

Figure 3:
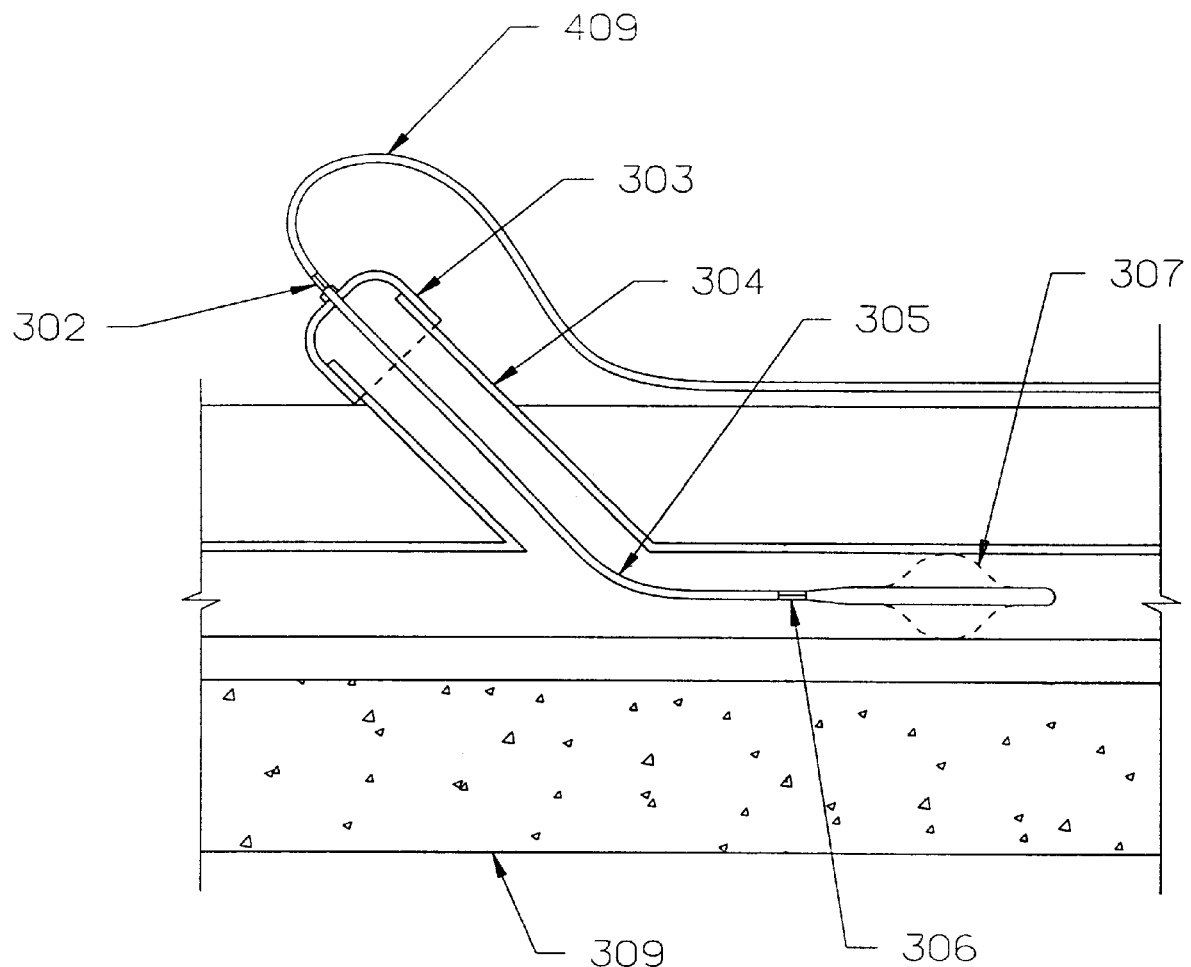
FIG. 3 is a cross section view of the cut off valve used to control the flow of stormwater before and during filtration.

As depicted in FIG. 1, the fastener 205 is plumbed into a pipe adapter 218 that connects to the common drain line 120. The stormwater passing though the filter canister 200 is piped by the common drain line 120 to the control valve 300. Control valve 300, as depicted in FIG. 3 consists of a pneumatic bladder 307 that is non-fouling and can be inserted into any straight section of pipe that is at least 24" long with little or no plumbing modification being required for installation. The bladder 307 may be inflated with compressed air from the compressor 408 to cut off water flow from the drain line 120 and deflated to allow flow to continue as filtration occurs. Air used to inflate or deflate the valve is conveyed using an air hose 409 that passes though a seal 302 located in the cap 303 of the control valve section 300 of the drain line. The pneumatic bladder 307 is attached to the air line 409 by means of a secure air tight connector 306.

Figure 4:
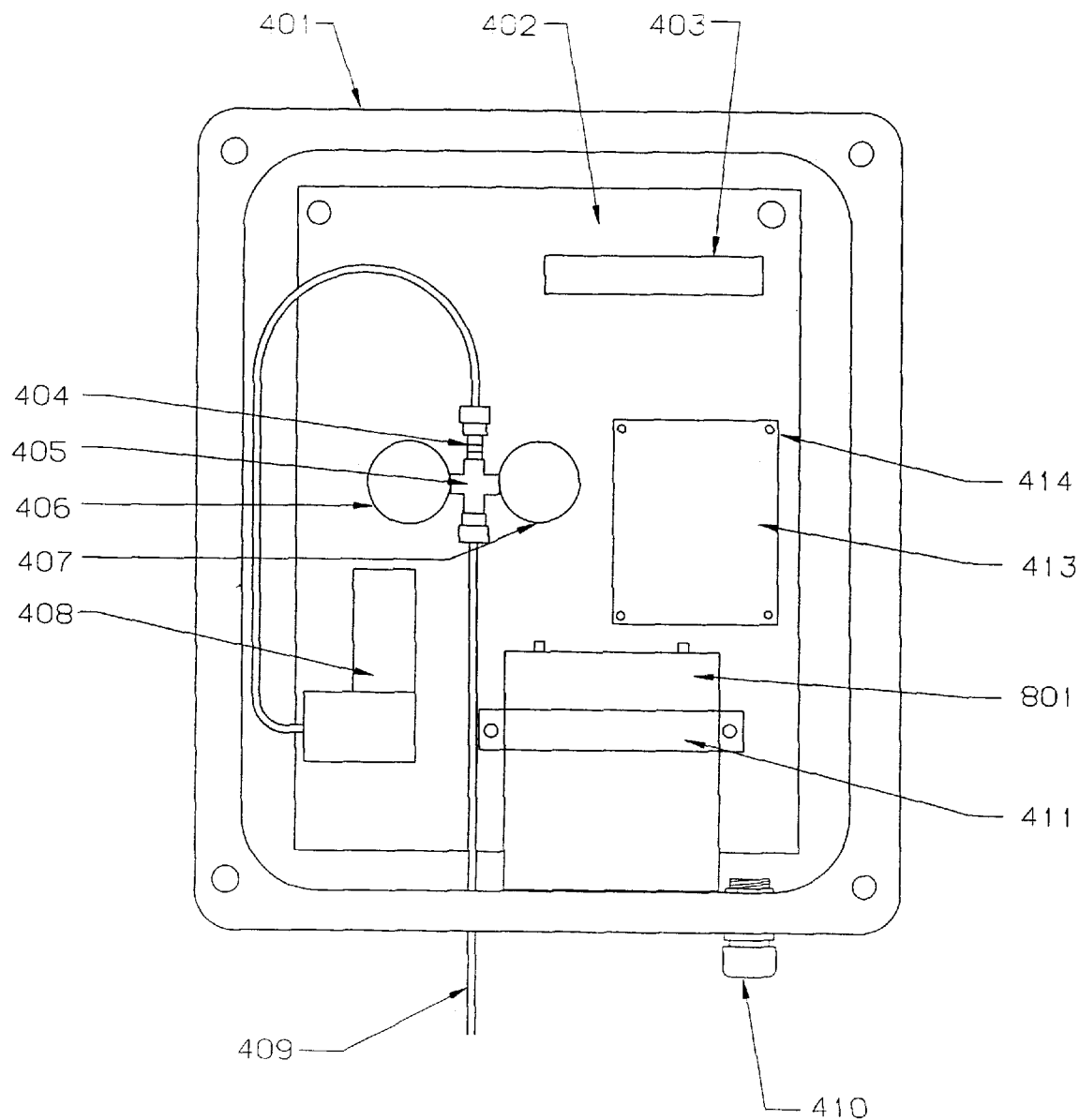
FIG. 4 is a cut-away perspective of the typical controller box and related components.

The control unit 400 is comprised of a control box 401 with a water tight lid as depicted in FIG. 4. In the preferred embodiment of the invention the control box 401 and lid are made of rigid water proof plastic material. The control box contains a 12 volt power supply (battery) 801, a digital controller board 413 mounted on the panel 402 by fastener, an air compressor 408, an air release valve 407, a pressure sensor 406, and other components required to monitor and provide automatic operation of the filter process.

The air supply line 409 leaving the controller box 401 provides air to the pneumatic control valve 300 that is depicted in FIG. 3. When conditions exist that cause the circuit board component 413 of the electronic controller (more detailed description provided below) to activate the air compressor 408, air is forced through the supply line 409 into the bladder portion 307 of the control valve 300 until such time as the bladder portion 307 of the control valve 300 inflates to a position which seals the bladder 307 in a position against the inner diameter of the control valve section of PVC pipe 304. After the bladder 307 has reached its inflated position against the inner wall of the pipe 307 the pressure switch 406 sends a signal to the logic board 413 to discontinue operation of the compressor 408. After the bladder valve 307 has been fully pressurized, the logic board 413 continues to monitor the pressure in the inflated bladder 307 by use of the information obtained through the analog pressure switch 406 that is supplied to the controller logic board 413. In the event the bladder pressure decreases, the logic board 413 activates the compressor 408 to send an increased volume of air through supply line 409 to maintain the inflated position of the bladder 307.

FIG. 3 depicts a cross section of the control valve pipe 300 depicting the air supply hose 409 coming from the controller box 400 through the water tight seal 302 located in the top of the cap 303. The air supply hose 409 is securely fastened by the seal 302 to prevent slippage of the portion of the line 305 located within the section of pipe containing the valve apparatus. The secured portion of the air hose 305 is fastened to the bladder 307 by use of a durable air tight fastener 306 that prevents the bladder 307 from traveling down stream within the drain pipe 120 when the bladder 307 is in its deflated and open valve position.

FIG. 4 depicts the various primary components located within the controller box 401 as originally designed for the preferred embodiment. A water tight connector 410 is fastened into the bottom of the controller box 401 to allow for passage of the wiring from the turbidity meter 600, the rain sensor 815 and the solar panel 800 into the controller box 401. The electronic components within the controller box 401 are mounted onto a removable service panel 402. These components include the air compressor and motor 408, the pressure release valve 407, the pressure switch 406, the cross adapter 405 and the check valve 404. Check valve 404 prevents the loss of air from the inflated bladder 307 feeding back throughout air compressor 408. A terminal bus 403 is utilized for making connections to the various sensors and the logic board 413. A 12 volt electric power supply (battery) 801 sits on the inner floor of the controller box 401 and is fastened to the removable service panel 402 by means of a bracket 411.

FIG. 5 is the internal configuration of a filter canister 500 (or 200 in FIG. 1) of the present invention. Cylinder 503 is provided with inlet ports 504 which allows unfiltered water to enter the inside 501 of the canister. An internal filter media cartridge 505 is held within the canister under spring tension as spring 509 urges against collar 510 which in turn presses against the filter media 505 of hollow filter cartridge 505. The spring 509 and the collar are centered by pin 513 which is attached to cap 502.

Cap 502 is thusly spring loaded. By pulling clip 508 out of the side of the cap 502, the cap is easily released from the cylinder 503. The clip, as seen in FIG. 5, extends through small holes in the cap and the cylinder. Spacer 507 enables the user to easily grasp the clip 508.

Water passes through the filter media 505 into the hollow discharge channel 506 and out an outlet (similar to outlet 213 shown in FIG. 2) into the drain pipe 120 as is well known in the filtering art. Cartridge 505 is replaceable by removing cap 502 and lifting the cartridge 505 from the cylinder 503. While the canister 500 of FIG. 5 is shown without an external filter screen as shown in FIG. 2, it should be understood that canister 500 may be equipped with such a screen.

Figure 7:
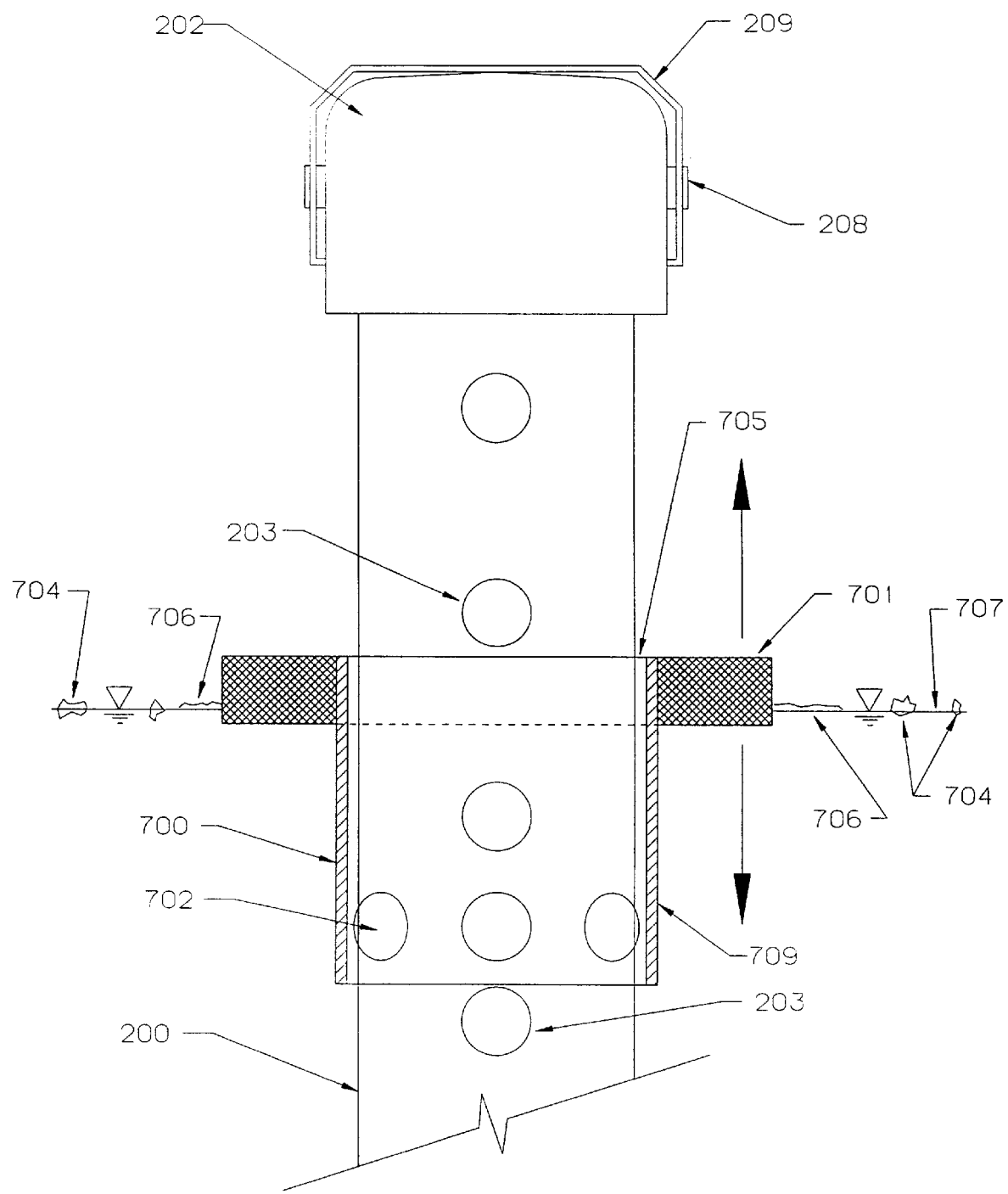
FIG. 7 is a cut away view of the separator ring that is positioned around the filtration canister depicting the direction of motion of the separator ring in relation to the filtration canister.

FIG. 7 illustrates the separator member 700 positioned floatingly between the canister input port 203 and impurities 706 (oil) and 704 (particulate). As the level of the water surface 707 rises and falls, separator 700 rises or falls accordingly. The space 705 between the outer wall of the canister 200 or the external filter media 206 (FIG. 2) and the inner wall of the separator is sufficient to allow for a non-binding slippage along the length of the canister, but not sufficient to allow larger particulate (above 0.1" diameter) floating on the water surface to enter the ports 203.

Separator 700 has a flanged shoulder 701 and a downwardly depending collar 709. The shoulder 701 keeps floating particulate away from the canister. Collar 709 is provided with a multiplicity of openings 702 on the end opposite the shoulder 701. When the openings 702 align with the inlet ports 203 in the canister, unfiltered water is allowed to enter the canisters for filtration.

Canister 200 is further provided with a removable cap 202 which enables the user to remove the filter media inside the canister. A quick release clip 209 is attached through the cap 202 as discussed above with canister 500. The release enables the user to easily remove the cap 202 and remove the entire filter cartridge as necessary.

FIG. 8 is a schematic drawing of the logic control board 413 and related components thereon. Electronically, the 12 volt DC solar panel 800 is used to maintain a charge in the battery units 801 so that unit is independent of external power. The 12 volt DC battery 801 provides 4.5 amp hour capacity to power the unit for extended periods of time without any solar power. The preferred embodiment of this unit will operate approximately 30 days during several rainfall events without the 12 volt DC battery 801 being provided with additional charge from the solar panel unit 800. A negative—(common voltage 802) is supplied to the logic control board 413 and all peripherals on a constant basis. A relay contact 803 (normally closed position) provides power to the air solenoid coil 804. The air solenoid valve 407 is a normally closed solenoid type valve that maintains air pressure in the bladder 307 at a constant level when the bladder is used in its inflated position 307. A solid state switch 805 is utilized to energize the air solenoid coil 804 for an approximate 10 second duration controlled by the digital timer 835 through the timer control line 837 to deflate the bladder 307, thereby opening the control valve 300. An LED indicator light 806 is used to indicate that the air solenoid is energized allowing the user to know that the air bladder 307 is being deflated. A relay contact 807 is used to activate the air compressor motor 808 when the relay coil 828 that operates contacts 803 and 807 is made to be in its closed position. The air compressor motor 808 provides compressed air upon demand in various durations when activated by the relay 828. A power diode 809 is utilized to prevent damage to the digital logic control board in the event the battery polarity is inadvertently reversed. A (+) plus voltage feed 810 is provided to the digital logic control board. A user is informed that the (+) plus voltage 810 to the logic control board has been activated by use of an LED indicator light 811 to indicate that the voltage is present. A standard rain sensor circuit 812 is utilized to detect the presence of rain depending upon the status of the contacts located in the rain sensor 815. The rain sensor circuit 812 detects the presence of rain and starts the sequence of events relevant to filtration by powering the digital logic control board 413 through solid state logic switch 819, starting the air compressor motor 808 to inflate the bladder valve 307 and preventing the starting of the long duration (i.e., 20 hours, 30 hours, or the like) timer 832 that maintains the pressure in the bladder 307 by inhibiting the air release solenoid valve 407 until the rain stops. Any reoccurrence of rain event during the preset timing duration resets the timer 832 by removing the power provided to the solid state logic switch 825 to the timer. An LED indicator light 813 is used to indicate to the user that the rain sensor 815 has been activated due to the rain fall event. The rain sensor input line 814 runs to the rain sensor circuit 812 from the rain sensor probe contacts 815. The rain sensor probe contacts 815 are made of non-corroding stainless steel to provide fail-safe operation. The rain sensor output line 816 from rain sensor circuit 812 leads to a flip/flop one 817. A logic high when rain is detected by the rain sensor probe contacts 815 and a logic low when no rain is present and the sensor probe contacts 815 are open. The flip/flop one 817 is used on the digital logic control board 413 to activate the solid state logic switch 819 that activates and maintains power to flip/flop 824 and timers 832 and 835.

A push button switch (momentary normally open) 818 is used to simulate rain to start the sequence of events produced by the digital logic control board in order to manually activate the control board for testing or other relevant purposes. The solid state logic switch 819 controlled by flip/flop one 817 is fed by output line 820 between flip/flop one 817 and the solid state logic switch 819. A push button switch (momentary normally open) 821 is utilized to reset the logic to the standby or resting state within the logic system. Logic switch 819 provides a switched plus voltage circuit 822 to power flip/flop two 824, the LED indicator light 823 indicating that the solid state logic switch 819 is active, and solid state logic switch 825. The flip/flop two on the digital logic board that is fed from the switched plus voltage 822 activates relay 828 through the pressure switch normally closed contact 827. The activated relay contact 807 closes causing the air compressor motor 808 to begin operation which inflates the bladder 307 to a predetermined pressure. When the predetermined pressure is reached, the pressure switch contact 827 opens and deactivates relay 828 which opens contact 807, shutting off the air compressor motor 808. If the pressure in the bladder 307 falls off, the pressure switch contact 827 will close and activate relay 828, closing contact 807 which will start the air compressor motor 808 to reinflate the bladder 307. When the pressure switch 827 is activated with the bladder pressure, the normally open contact 829 will close and activate indicator 830 which indicates the bladder valve 300 is in the closed position preventing stormwater from flowing through the drain pipe 120 to the discharge side of the pipe 195 (FIG. 1).

Solid state logic switch 825 is activated by voltage from solid state logic switch 819 in logic low (rain has ceased) from the rain sensor circuit 812. The solid state logic switch 825 provides power to the timing circuits 832 and 835. An output line 826 is used from the digital long term timer 832 to reset flip/flop two 824 at the end of the long duration (i.e., 20 hours, 30 hours, or the like) time period and to start the solid state 10 second timer 835. The resetting of flip/flop two 824 prevents the air compressor motor 808 from starting when the pressure is lost in the bladder valve 307. The timer 835 activates the solid state logic switch 805 which, in turn, activates the air solenoid coil 804 for a 10 second period through the normally closed relay contact 803. The activated open air solenoid deflates the bladder 307 in the bladder valve 300 and allows water to flow through the filter canisters 200, drain pipe 120 then exiting drain pipe 195. The pressure switch contact 827 is a normally closed contact, and the relay coil 828 operates contact 803 and 807. The pressure switch contact 829 is a normally open contact switch. When the bladder valve 300 is closed the LED indicator 830 is used to indicate the bladder is in its closed or pressurized condition. Timers 832 and 835 are activated by solid state logic switch 825 through the switched (+) plus voltage 831 that runs from solid state logic switch 825 to timers 832 and 835. The primary timer 832 is a digital long term timer on the logic control board 413 consisting of a solid state oscillator and a digital divider to produce an output 826 20 hours after being actuated. The output 826 resets flip/flop two 824 and starts solid state air solenoid timer 835. The period (time per cycle) of the oscillator is controlled by the timing resistor 834. An LED indicator 833 is used to indicate the period of the oscillator in timer 832. A timing resistor 834 is present for the oscillator in timer 832.

A solid state timer 835 is started by the output line from the digital long term timer 832 and times the energized time of the air solenoid coil 804 by activating solid state logic switch 805 through output line 837. A timing resistor 836 is provided for the solid state timer 835. Solid state logic switch 805 is activated using the output line 837 from solid state timer 835. When the output line 837 activates solid state logic switch 805 it also resets flip/flop one 817 which returns the digital logic controller to its resetting state and low current consumption.

Figure 6:
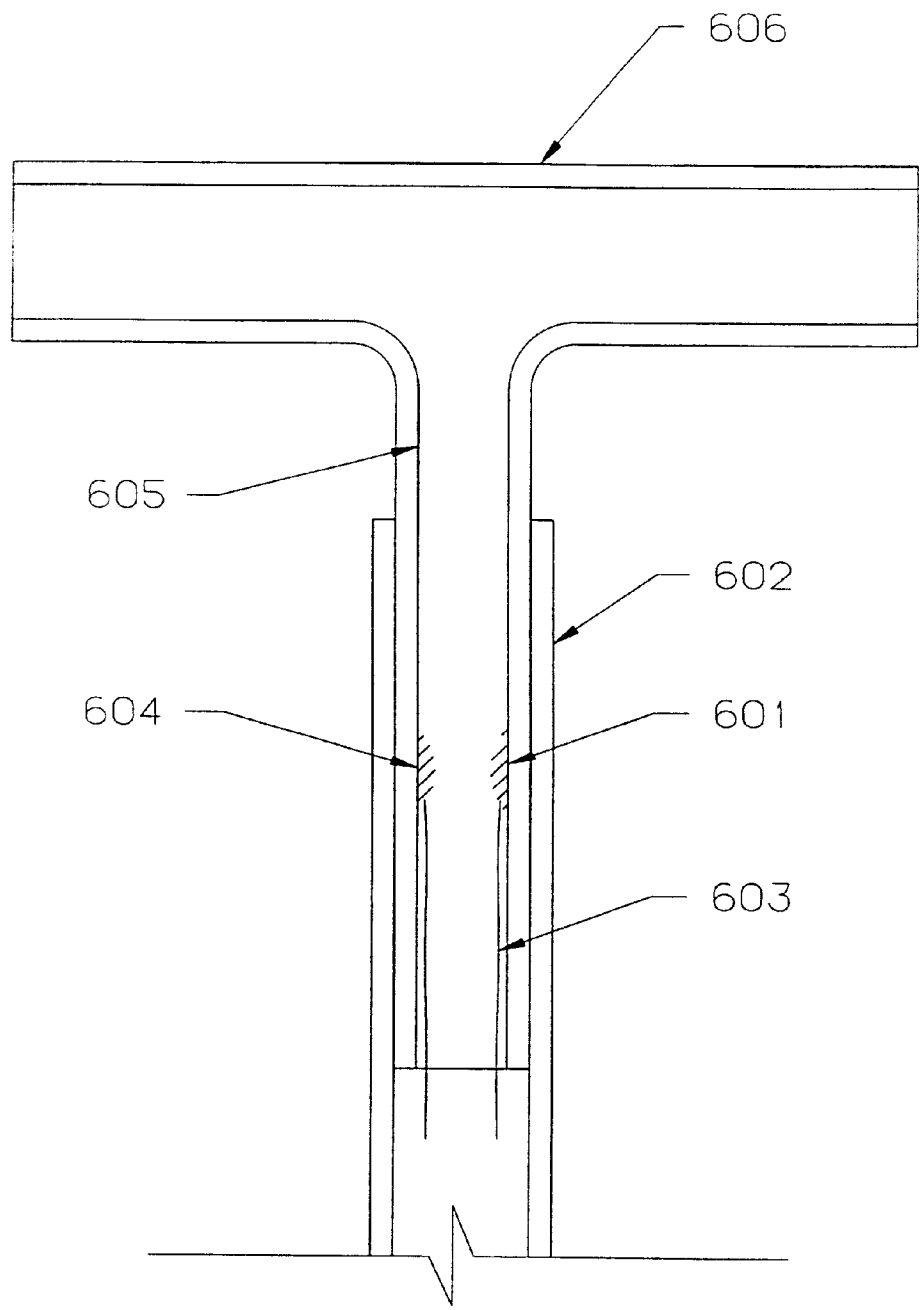
FIG. 6 is a cross section view of the turbidity sensor.

FIG. 6 depicts a cross section of the turbidity meter (option) that would utilize a light emitting diode 601 and a receiver 604 to determine the level of particulate matter contained in the stormwater that would flow between the open space between the receiver and the light emitting diode. When used, the supply lines 603 to the light emitting diode and the lines forming the circuit in the sensor would be tied to the appropriate component on the logic board 413 and would travel between the logic board and the turbidity meter 606 through the water tight connector 410 at the bottom of the controller box 401. The structural component of the turbidity meter 606 is made up of a PVC tee 605 inserted into a larger diameter PVC pipe 602 which has been beveled to allow for placement of the sensor 604 and light emitting diode 601.

Figure 9:
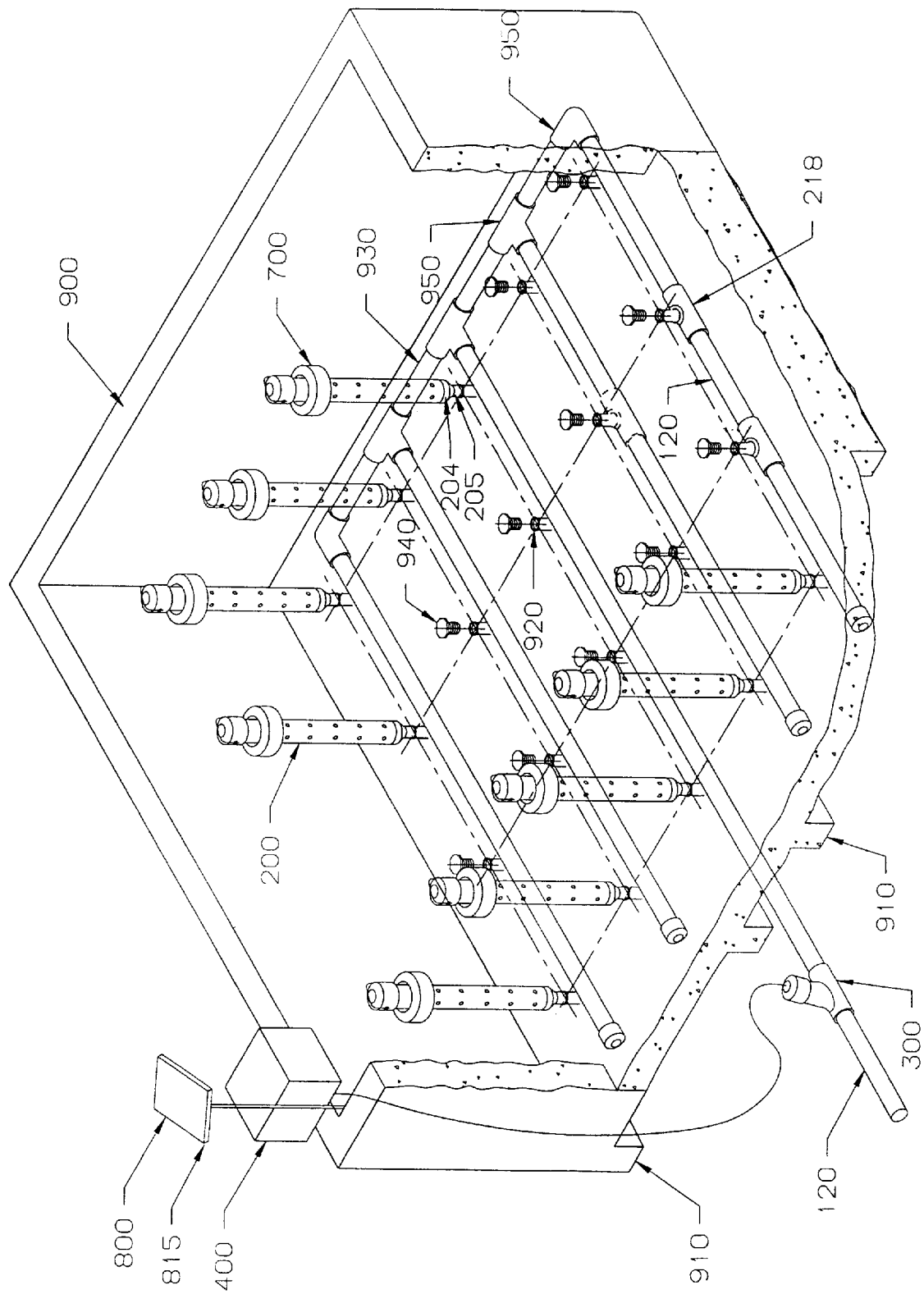
FIG. 9 is a perspective and isometric view of the stormwater separation, sedimentation and filtration device embodied in the present invention shown in an alternate preferred embodiment utilizing a preplumbed, precast concrete rectangular basin unit.

Picture of FIG. 9 depicts an embodiment of the filtration, sedimentation and separation processing device with the controller box 400 and solar panel 800 and rain sensor 815 (not shown) constructed with a precast concrete structure 900 that contains a drain pipe 120 that is preplumbed beneath the floor of the concrete structure 900 passing through and on either side of support beams 910 that run the length of the concrete structure 900 to provide a space beneath the structure 900 for placement of the drain pipe 120 plumbing field. In this depiction of the preferred embodiment, the filter canisters 200 and related separator devices 700 are mounted in a compact arrangement through the floor of the concrete structure 900 into preset threaded inlets 920 that are evenly spaced throughout the floor of the structure 930. When using the embodiment of FIG. 9, sealing plugs 940 are placed into the preplumbed threaded inlets 920 depending upon the number of filter canisters 200 that are desired to be used based on the spacing of the receiving watershed area. One advantage of the embodiment contained in a precast concrete structure 900 is that the precast structure is a module unit that can be constructed off site and dropped in place. Additionally, the precast units can be plumbed so that there are slip joints on the back end of the precast unit at location 950 so that several modular units could be placed in line with one joining the other using the slip joints 950 at the back end and front end of the middle modular units. The end modular units 900 would require an elbow and teed plumbing connection on the main drain line 120 to loop the line among the several drain pipes in drainage field located on the floor of the structure. The first module unit 900 in the series (when more than one is used) would contain the controller valve 300 and the control box 400 and other related apparatus. The use of this embodiment will allow off site construction of several modular units that could be precast off site and dropped in place very efficiently to either accept first flush flows directly from the surface area from which stormwater is to be treated or could be used as a single or multi modular filter unit system receiving flow from an additional rough cut basin in which water is stored and collected and then fed via a pipe inlet into the precast modular filtration unit(s) as depicted in FIG. 9. Whether installed in a cast in place basin or a precast unit, grates or lids can be used, if desired, to cover and enclose the basin to allow use of the surface area above the basin for parking or other development.

EXAMPLES

The following examples describe the manner and process of using the present invention and sets forth the best mode contemplated by the inventors of carrying out the invention, but is not to be confused as limiting the scope thereof.

Example 1

A combination above grade automatic stormwater separation and filtration system and method of separation of filtration is utilized at the low end of a parking lot of a real estate development. The system is plumbed into a pour in place basin that is designed to hold a capacity of ½" to 1" of the initial stormwater runoff (first flush) leaving the paved service. A weir or berm is put in place so that after the basin has reached its first flush capacity the remainder of the stormwater, which would be much cleaner due to the washing off of pollutants in the first flush, is diverted directly into the storm sewer or collection system. After the preset amount of time has occurred from the beginning of the rainfall event that caused the stormwater run off, the bladder valve would open allowing the filter cartridges contained within the filter canisters to begin filtration During time of filtration, after sedimentation had occurred, the separator devices would continue to separate free floating pollutants such as oils and floating particulate matter, located on the surface of the water in the basin from coming in contact with the filter cartridges or filter canister units. This separation insures that chemicals and other floating pollutants or materials do not decrease from the efficiency of the filtration process provided by this invention.

Example 2

An existing stormwater basin providing sedimentation, filtration and separation for a development that utilizes a sand, diatomaceous earth or other type of high maintenance filter medium that is subject to clogging due to sedimentation, is retrofitted by removal of the filtration medium (i.e., sand etc.) and installation of the collection lines and above grade automatic stormwater separation filtration system and method of separation and filtration. The automated shut off valve is plumbed into the portion of the main drain line closest to the headwall of the existing basin that contains the drain pipe to the stormwater sewer collection system or receiving stream. The basin is then backfilled with earthen material or preferably, with concrete to cover the PVC drain pipe with at least two inches of cover. Utilization of the present invention in a retrofit situation such as in this example would increase the capacity of the first flush that can be contained in the basin enhancing total filtration capabilities and further protect against stormwater pollution. Additionally, maintenance becomes much simpler after the retrofit in that the huge bed of filtered material that would ordinarily have to be handled, cleaned, raked and ultimately disposed of on a regular basis, will have been replaced with efficient cartridge typed filters located in the filter canisters that make up a part of the present invention. These filter cartridges can be removed and recycled, with replacement occurring as often as necessary depending on pollutant loads and rain fall.

In both examples 1 and 2 above, the current invention would utilize the common element of timing the beginning of the filtration process so that maximum sedimentation could occur, dropping pollutants out of the contained stormwater and maximum separation could occur layering floating or light pollutants on the top of the water level prior to beginning filtration through opening of the controller valve. As filtration occurs and water levels decrease in the basin the pollutants that have sedimented on the bottom of the basin will eventually be merged with the floating pollutants on the water surface after total draining and filtration has occurred. A certain component of evaporation would be figured into the ultimate removal of water from the basin allowing the free floating pollutants (oils, particulate matter) to bond with the sediment in the bottom of the basin resulting in a slowly building sludge material which can be easily periodically cleaned and removed by ordinary maintenance protocol.

Figure 10:
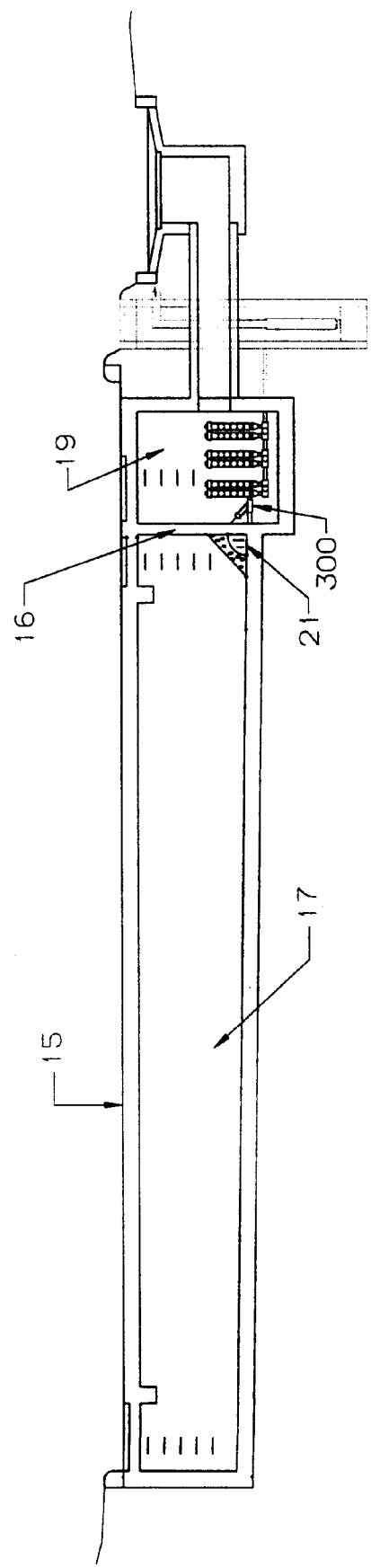
FIG. 10 illustrates separate collection and filtration chambers in a single basin.
Figure 11:
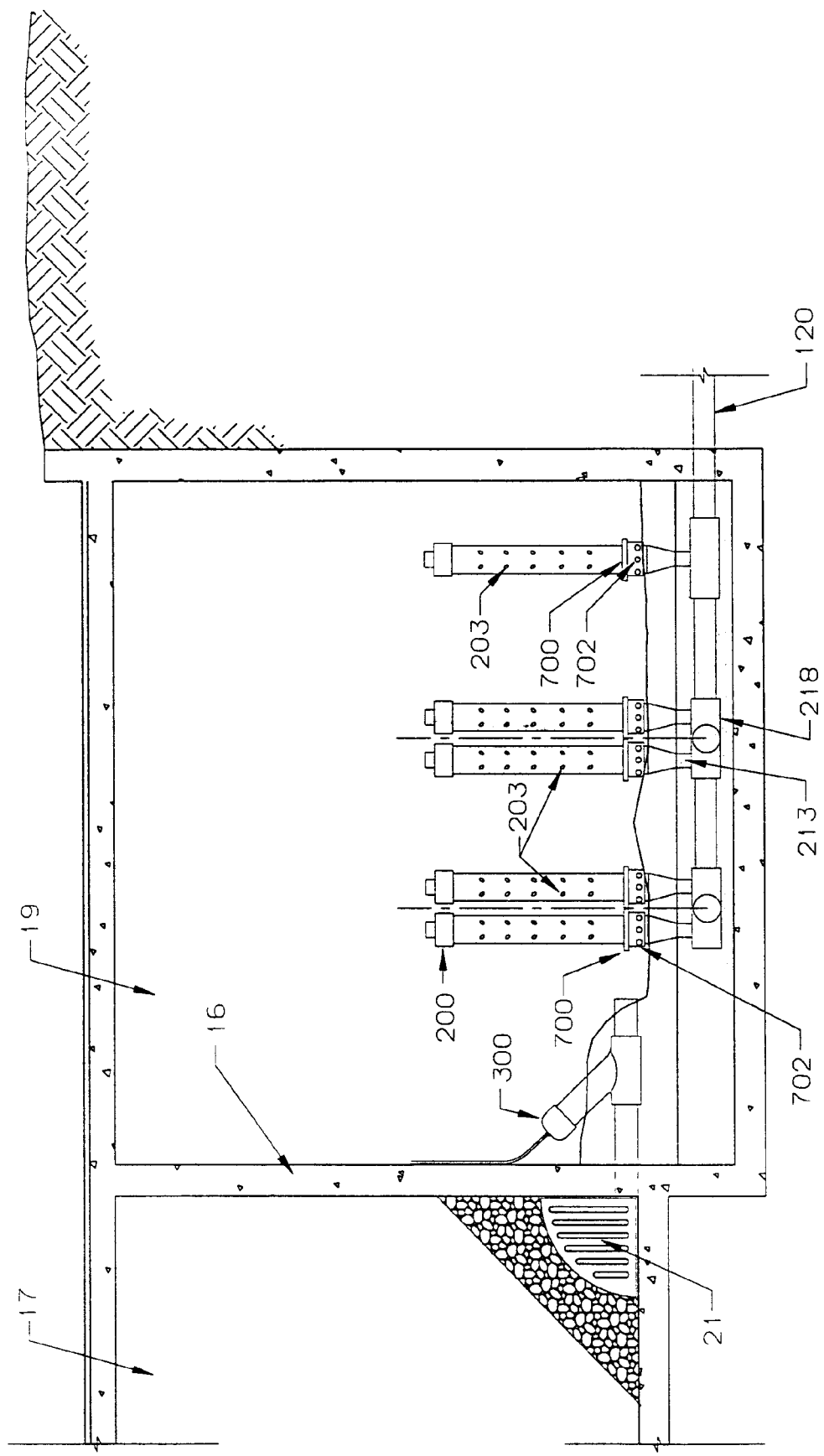
FIG. 11 illustrates a detailed view of the filtration chamber of the embodiment of FIG. 10.

Yet another embodiment of the present invention may be seen in FIGS. 10 and 11. This embodiment has been demonstrated to prolong the life of the cartridge filter media in certain circumstances. In this embodiment the collection and initial sedimentation of the stormwater runoff takes place in a separate compartment of the basin. Basin 15 has two compartments 17 and 19. The stormwater runoff is initially collected in catch basin 17. After a set period of time during which sedimentation of impurities occurs, control valve 300 may be opened in the manner discussed above. Settled, unfiltered runoff enters filtration compartment 19 from catch basin 17. The location of the discharge port 21 in catch basin 17 may vary depending upon the sedimentation design perimeters. In FIG. 10 the discharge port 21 is positioned in the bottom portion of compartment 17 along divider wall 16.

Opening of valve 300 allows settled, unfiltered runoff water to flow into compartment 19 which is plumbed with above grade filter canisters 200 as shown in FIG. 11. The canister may be provided with separator rings 700. The canisters 200 and separators 700 are identical in structure to those described in the other embodiments of this invention. Unfiltered runoff passes through inlet opening 203 and out discharge opening 213 into discharge pipe 120 for further treatment if and as necessary.

This invention is used for any situation in which it is desired to filter quantified amounts of stormwater run off. By use of a logic board, automated control valve, together with the unique filtration canisters and method of filtration, stormwater filtration can be performed on an efficient and economic scale.

While the preferred embodiments have been fully described and depicted for the purpose of explaining the principles of the present invention, it will be appreciated by those skilled in the art that modification, substitutions and changes may be made due to without departing from the scope of the invention set forth in the appended claims. The embodiments of the invention in which the exclusive property of privileges claimed are defined as follows:

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. A system for treating stormwater runoff containing impurities comprising:

a collection basin for receiving said runoff containing said impurities;

an above basin grade means for filtration of collected runoff within said basin, said filtration means further comprising:

at least one drain pipe having an inlet in a top side of said drain pipe and discharging filtered runoff only outside said collection basin;

at least one filter canister having a first upper, capped end and a second, lower discharge end and at least one input port for passage of unfiltered runoff from said basin to the inside of said canister, said canister having an internal filter media in said inside of said canister; and a discharge port in said second lower end of said canister in fluid communication with said inlet in said top side of said drain pipe for filtered runoff water inside said canister to enter into said drain pipe for discharge outside said collection basin;

a separator member disposed floatingly about said canister between said input port and said impurities floating on the surface of said unfiltered runoff, said separator member further comprising a cylindrical wall member extending entirely around said separator member above said surface of said unfiltered runoff, said filtration means activatable after a predetermined controllable sedimentation period.

2. The system of claim 1 wherein said filtration means further comprises a control valve to allow filtered runoff to be discharged from said basin.

3. The system of claim 2 wherein said control valve further comprises a pneumatic bladder within a valve housing, said bladder inflatable upon activation of a remote pneumatic compressor.

4. The system of claim 2 wherein said control valve is activatable in response to an environmental condition sensor.

5. The system of claim 2 wherein said environmental control sensor is a rain gauge or a turbidity meter.

6. The system of claim 2 wherein said filtration means further comprises a time delay controller for setting said predetermined, controllable sedimentation period, said controller connected to said control valve to open said valve to initiate said filtration.

* * * * *